(12) United States Patent
Sugitani et al.

(10) Patent No.: US 12,433,601 B2
(45) Date of Patent: *Oct. 7, 2025

(54) INDWELLING CLIP

(71) Applicant: ZEON CORPORATION, Tokyo (JP)

(72) Inventors: Tatsurou Sugitani, Tokyo (JP); Hikaru Mizuno, Tokyo (JP); Masakazu Ninomiya, Tokyo (JP)

(73) Assignee: Zeon Corporation, Tokyo (JP)

( * ) Notice: Subject to any disclaimer, the term of this patent is extended or adjusted under 35 U.S.C. 154(b) by 759 days.

This patent is subject to a terminal disclaimer.

(21) Appl. No.: 17/043,547

(22) PCT Filed: Mar. 29, 2019

(86) PCT No.: PCT/JP2019/014279
§ 371 (c)(1),
(2) Date: Sep. 29, 2020

(87) PCT Pub. No.: WO2019/189863
PCT Pub. Date: Oct. 3, 2019

(65) Prior Publication Data
US 2021/0113210 A1 Apr. 22, 2021

(30) Foreign Application Priority Data

Mar. 30, 2018 (JP) .................... 2018-068989

(51) Int. Cl.
*A61B 17/122* (2006.01)
*A61B 90/00* (2016.01)

(52) U.S. Cl.
CPC ........ *A61B 17/122* (2013.01); *A61B 17/1227* (2013.01); *A61B 90/39* (2016.02);
(Continued)

(58) Field of Classification Search
CPC .............. A61B 17/122; A61B 17/1227; A61B 2090/3979; A61B 2090/3966; A61B 90/39; A61B 17/083; A61B 2090/3941
See application file for complete search history.

(56) References Cited

U.S. PATENT DOCUMENTS

2008/0255427 A1* 10/2008 Satake .................. A61B 17/08
606/205
2010/0331674 A1* 12/2010 Sohn .................. A61B 17/1227
600/431
(Continued)

FOREIGN PATENT DOCUMENTS

CN 101933835 A 1/2011
JP 2001-520069 10/2001
(Continued)

OTHER PUBLICATIONS

Google Patents English translation for WO 2015/182737 as accessed on Jul. 26, 2023; https://patents.google.com/patent/JPWO2015182737A1/en?oq=wo+2015%2f182737 (Year: 2023).*
(Continued)

*Primary Examiner* — Sarah A Long
*Assistant Examiner* — James R McGinnity
(74) *Attorney, Agent, or Firm* — Knobbe, Martens, Olson & Bear, LLP

(57) ABSTRACT

An indwelling clip includes a pair of arm plate portions that can be opened in a substantially V shape with an elastic force and claw portions formed on respective tip portions of the arm plate portions. The indwelling clip also includes a fastening ring attached to the arm plate portions so as to be movable along a longitudinal direction of the pair of arm plate portions and be able to close the pair of arm plate portions by moving in a direction toward the claw portions. The arm plate portion is provided with a fluorescent body containing a fluorescent pigment emitting red or near infra-
(Continued)

red light by being irradiated with excitation light. According to some embodiments, the indwelling clip allows easy visual recognition of light emission of a fluorescent body from the outside of a hollow organ and enables excellent attachment stability to the inner wall of the hollow organ.

10 Claims, 15 Drawing Sheets

(52) U.S. Cl.
CPC ............... *A61B 2090/3941* (2016.02); *A61B 2090/3979* (2016.02)

(56) References Cited

U.S. PATENT DOCUMENTS

| | | | |
|---|---|---|---|
| 2017/0281176 | A1 | 10/2017 | Maekubo et al. |
| 2017/0303817 | A1* | 10/2017 | Henary .................. A61F 13/15 |
| 2018/0008447 | A1* | 1/2018 | Jacobs ............. A61B 17/12099 |

FOREIGN PATENT DOCUMENTS

| | | |
|---|---|---|
| JP | 2005-218680 A | 2/2004 |
| JP | 3159938 U | 6/2010 |
| JP | 2011-005227 A | 1/2011 |
| JP | 2016-108501 A | 6/2016 |
| WO | WO 1999/020183 | 4/1999 |
| WO | WO 2015/182737 A1 | 12/2015 |

OTHER PUBLICATIONS

International Preliminary Report on Patentability issued in the corresponding application No. PCT/JP2019/014279, dated Oct. 6, 2020.
International Search Report issued in application No. PCT/JP2019/014279, dated Jun. 18, 2019.
Extended European Search Report issued in EP Application No. 19775596.0, dated Nov. 30, 2021.
Office Action issued in Chinese Application No. 201980018264.0, dated Nov. 27, 2023.
Notice of Reasons for Refusal issued in Japanese Application No. 2023-076903, dated Sep. 3, 2024.
Extended European Search Report issued in EP Application No. 25161725.4, dated May 16, 2025.

\* cited by examiner

INDWELLING CLIP

TECHNICAL FIELD

The present invention relates to an indwelling clip usable as, for example, a marker that can be inserted into a lumen by means of an endoscope and whose position can be visually recognized from the outside of the lumen.

BACKGROUND ART

In general, diseases such as cancer of the digestive tract such as the esophagus, stomach, and large intestine develop and progress mainly from the mucous membrane of the digestive tract. Likewise, lung cancer develops mainly from the tracheal mucosa and bladder cancer develops and progresses mainly from the bladder mucosa. Accordingly, in order to confirm the diagnosis of a disease of a hollow organ such as the digestive tract, trachea, and bladder, it is essential to insert an endoscope into the hollow organ, observe the mucous membrane, and perform biopsy on the affected tissue. Then, the affected tissue is surgically excised as necessary based on the confirmed diagnosis.

However, a surgeon approaches the hollow organ from the outside during the surgical resection, and thus it is impossible to directly and visually recognize the affected area. In other words, in a case where the digestive tract, lungs, or bladder is observed with the naked eye or a laparoscope during thoracotomy, laparotomy, or laparoscopic surgery, the mucous membrane is invisible whereas the gastrointestinal serosa, tracheal serosa, and bladder peritoneal surfaces are visible. Accordingly, it is necessary to attach a marker into the hollow organ such that excision area determination is possible even in the case of observation from the outside of the hollow organ.

Surgical markers have been proposed as such a marker. The surgical markers are placed near a clip that is locked to a mucous membrane in the body and include an LED emitting near infrared light or an illuminant formed of a fluorescent luminescent substance (Patent Document 1).

However, the surgical marker that uses the LED as an illuminant requires an electric power supply, and thus an increase in complexity arises in terms of device configuration and it is difficult to form the marker with compactness such that the marker can be passed through the treatment instrument guide tube of an endoscope. In addition, although the surgical marker that uses the illuminant formed of the fluorescent luminescent substance emits fluorescence by irradiation with excitation light from the outside of a hollow organ and it is not necessary to supply electric power for fluorescence emission, the intensity of the fluorescence emitted to the outside (serosal side) of the hollow organ is weak and it is practically difficult to visually recognize the luminous part from the outside of the hollow organ.

Patent Document 2 proposes a biological compression clip to address the above-described drawbacks of the surgical markers. The clip includes a clip main body having an arm portion and a tubular member fastened to the clip main body such that the arm portion can be closed. The clip is provided with a pressing portion that presses a mucous membrane (hollow organ inner wall) against the tubular member and contains a fluorescent pigment emitting red or near infrared light. In this clip, the pressing portion containing the fluorescent pigment is attached to the hollow organ inner wall with the wall of the hollow organ pressed, and thus fluorescence attenuation during transmission through the hollow organ wall (hemoglobin in blood in particular) is kept to a minimum. As a result, the luminous part can be visually and satisfactorily recognized even in the case of fluorescence observation from the outside of the hollow organ. However, in the clip illustrated in Patent Document 2, a resin material containing a fluorescent pigment constitutes the tubular member (fastening ring) for arm portion closing, and thus fastening to the hollow organ inner wall by the arm portion is likely to loosen and the attachment stability of the clip main body needs to be improved.

CITATION LIST

Patent Document

Patent Document 1: JP 2005-218680 A
Patent Document 2: WO 2015/182737 A

SUMMARY OF THE INVENTION

Problem to be Solved by the Invention

The invention has been made in view of such a point, and an object of the invention is to provide an indwelling clip that allows easy visual recognition of light emission of a fluorescent body from the outside of a hollow organ and that enables excellent attachment stability to the inner wall of the hollow organ.

Means for Solving Problem

An indwelling clip according to the invention includes:
a pair of arm plate portions capable of opening in a substantially V shape with an elastic force;
claw portions formed on respective tip portions of the arm plate portions; and
a fastening ring attached to the arm plate portions so as to be movable along a longitudinal direction of the pair of arm plate portions and be able to close the pair of arm plate portions by moving in a direction toward the claw portions,
in which at least one of the arm plate portions is provided with a fluorescent body containing a fluorescent pigment emitting red or near infrared light by being irradiated with excitation light.

The indwelling clip of the invention is transported into a hollow organ and attached to the inner wall of the hollow organ by means of, for example, an endoscope and a clip device. When the clip is attached, the claw portion of the main body of the clip is pressed against the inner wall of the hollow organ and the fluorescent body provided on the arm plate portion is positioned near the pressed hollow organ inner wall.

As a result, according to the indwelling clip of the invention, fluorescence attenuation during transmission through a hollow organ wall is kept to a minimum and it is easy to visually recognize the light emission of the fluorescent body from the outside of the hollow organ. In addition, it is not necessary to configure the fastening ring closing the arm plate portion with a fluorescent body, and thus the design of the fastening ring is unrestricted and the clip is capable of being excellent in terms of the stability of attachment to the hollow organ inner wall. It should be noted that the visual recognition of the light emission of the fluorescent body from the outside of the hollow organ may be performed visually or by image recognition by means of an imaging device such as a laparoscope in accordance with the wavelength of the light or the like.

The fluorescent body may be provided on an outer surface or an inner surface of the arm plate portions. In addition, the fluorescent body may be engaged with a through hole formed on the arm plate portions. Further, the fluorescent body may be continuously provided from the outer surface of the claw portion to the outer surface of the arm plate portion. Further, the fastening ring may be made of metal.

The fluorescent body may have a tip protruding portion protruding outward from the tip portions of the arm plate portions. Preferably, the tip protruding portion is provided on each of the pair of arm plate portions. Preferably, at least a part of the tip protruding portion protrudes along an extension direction of the claw portion from a side thereof.

The claw portion may include at least a part of the tip protruding portion.

MODE(S) FOR CARRYING OUT THE INVENTION

Hereinafter, embodiments of the invention will be specifically described with reference to the drawings.

First Embodiment

Figure 1:
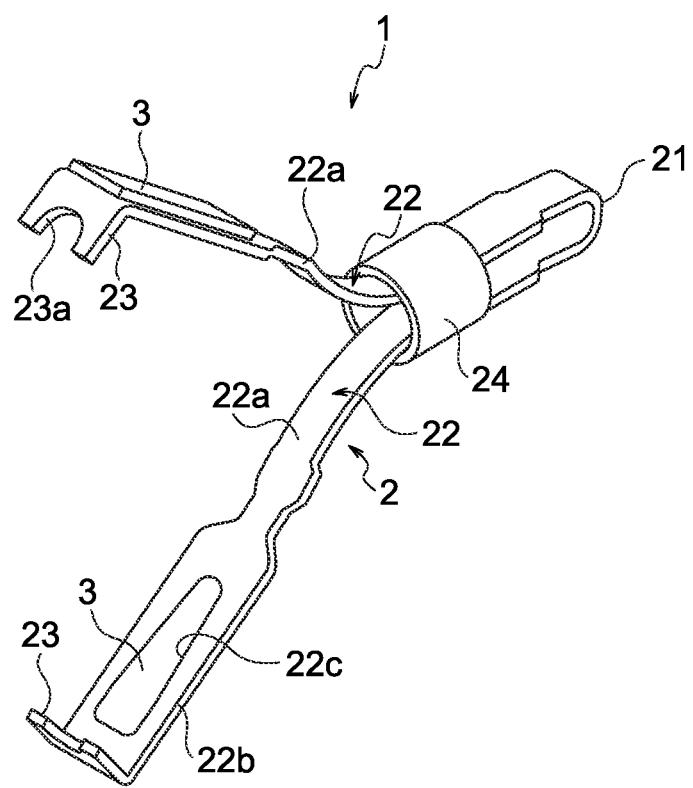
FIG. 1 is a perspective view illustrating an overall configuration of an indwelling clip of an embodiment of the invention in a state where an arm plate portion is open.

First, a first embodiment of the invention will be described with reference to FIGS. 1 to 6. As illustrated in FIG. 1, an indwelling clip 1 of the present embodiment is used as, for example, a marker that can be attached to the inner wall of a hollow organ in a living body and whose position can be visually recognized from the outside of the lumen. The indwelling clip 1 has a clip main body 2 and a fluorescent body 3.

The clip main body 2 includes a connecting plate portion 21, a pair of arm plate portions 22, and a fastening ring 24. The connecting plate portion 21 is folded in a substantially U shape. The arm plate portions 22 and 22 are integrally formed so as to be respectively continuous with the end portions of the U shape and open in a substantially V shape toward the tip side thereof.

Figure 2:
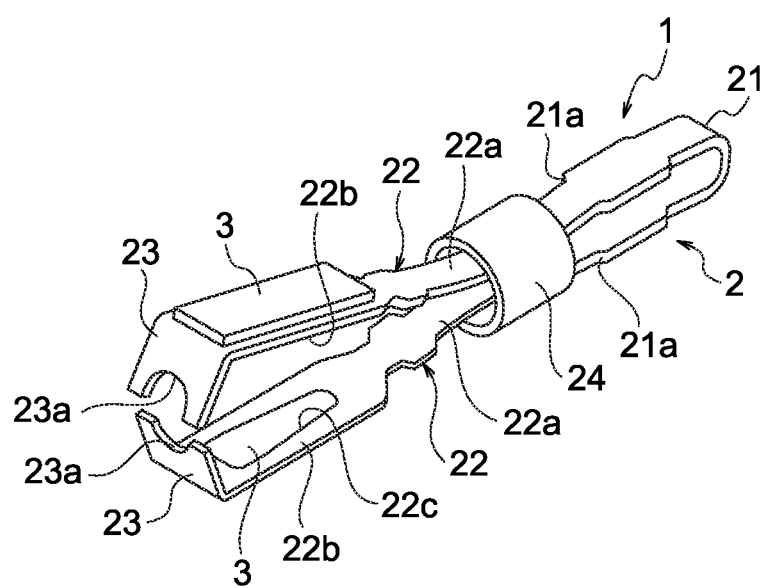
FIG. 2 is a perspective view illustrating a state where the arm plate portion of the clip of FIG. 1 is closed.

The fastening ring 24 is a ring-shaped member that is slidably and externally fitted onto the connecting plate portion 21 on the base end side of the arm plate portion 22. The fastening ring 24 is a member that is slid by means of a clip device 5 illustrated in FIG. 3A (described later). The clip device 5 has an inner sheath 52 and a connecting hook 51 disposed so as to be capable of moving forward and backward with respect to the inner sheath 52 and detachably connected to (disengageably engaged with) the connecting plate portion 21. The fastening ring 24 illustrated in FIGS. 1 and 2 is pressed by the distal end of the inner sheath 52, slides, and closes the arm plate portion 22 by the connecting hook 51 being pulled inward from the tip portion of the inner sheath 52 as illustrated in FIG. 4B with the connecting hook 51 illustrated in FIG. 3A connected to the connecting plate portion 21.

As illustrated in FIG. 1, a claw portion 23 is integrally formed in the tip portion of each arm plate portion 22. The claw portion 23 is folded toward the inner side (that is, in the closing direction) at the tip of the arm plate portion 22. Each claw portion 23 has a recessed notch portion 23a at the intermediate part of the tip thereof.

The connecting plate portion 21, the pair of arm plate portions 22, and the pair of claw portions 23 are formed by one thin and slender plate material being folded and molded. Although not particularly limited, the plate thickness of the plate material constituting the connecting plate portion 21, the pair of arm plate portions 22, and the pair of claw portions 23 is preferably 0.10 to 0.30 mm. An elastic metal plate is preferable as the plate material. For example, a stainless steel plate is used as the plate material. In addition, the fastening ring 24 is also made of metal in the present embodiment. The material of the fastening ring 24 is not particularly limited. The fastening ring 24 may be made of a metal (such as stainless steel) similar to the metal of the plate material constituting the arm plate portion 22 and so on. Alternatively, the fastening ring 24 may be made of a metal different from the metal of the plate material constituting the arm plate portion 22 and so on, examples of which include a titanium alloy, gold, and aluminum.

Each of the arm plate portions 22 has a base end portion 22a and a grip portion 22b. A through hole 22c is formed in the grip portion 22b of each arm plate portion 22. The through holes 22c are formed without impairing the desired strength of the arm plate portion 22 (grip portion 22b). The through holes 22c are formed from the viewpoint of elasticity (repulsive force) adjustment at a time when the arm plate portion 22 is closed by the fastening ring 24.

A substantially cylindrical ring member constitutes the fastening ring 24 slidably fitted on the connecting plate portion 21. Alternatively, the fastening ring 24 may be constituted by a spring obtained by a wire rod being wound into a coil shape. The connecting plate portion 21 is inserted through the guide hole inside the fastening ring 24, and the fastening ring 24 is mounted (externally fitted) so as to be axially movable (slideable) between the outer periphery of the connecting plate portion 21 and the outer periphery of the base end portion 22a of the arm plate portion 22. It should be noted that a stopper protrusion 21a is formed on the connecting plate portion 21 as illustrated in FIG. 2 such that the fastening ring 24 does not come off to the outside of the connecting plate portion 21.

In a state where the fastening ring 24 is disposed on the rear side of the arm plate portion 22 (connecting plate portion 21) as illustrated in FIG. 1, the arm plate portion 22 is open owing to the elasticity of the arm plate portion 22 itself. It should be noted that it is possible to close the arm plate portion 22, if necessary, by moving (sliding) the fastening ring 24 to a position near the tip of the base end portion 22a (close to the grip portion 22b) as illustrated in FIG. 2.

As illustrated in FIG. 1, the outer surface of at least one of the arm plate portions 22 (preferably the outer surfaces of both arm plate portions 22) is provided with the fluorescent body 3 containing a fluorescent pigment emitting red or near infrared light as a result of irradiation with excitation light. The fluorescent body 3 is mounted onto the outer surface of the arm plate portion 22 by adhesion, insert molding, or the like.

Although the shape of the fluorescent body 3 in the present embodiment is the same as the outer surface shape of the grip portion 22b of the arm plate portion 22, the shapes may be different from each other. It is preferable that the fluorescent body 3 is formed of a polymer material composition containing a fluorescent pigment. It is preferable that the fluorescent pigment emits fluorescence in a red or near infrared wavelength range of 600 to 1,400 nm. Light in such a wavelength range is highly transmissive with respect to human tissue such as skin, fat, and muscle and is capable of satisfactorily reaching approximately 5 mm to 20 mm below a biological tissue surface.

Examples of the fluorescent pigment that emits the fluorescence in the wavelength range described above include a water-soluble pigment such as riboflavin, thiamine, nicotinamide adenine dinucleotide (NADH), and indocyanine green (ICG) and an oil-soluble pigment such as the azo-boron complex compound described in JP 2011-162445 A. A pigment highly compatible with a polymer material is particularly preferable in that the pigment is stably retained in the polymer material without elution in a living body. Especially, the azo-boron complex compound described in JP 2011-162445 A or the like is preferable in that the compound or the like is excellent in fluorescence emission intensity and in light resistance, heat resistance, and compatibility with respect to a polymer material such as polyurethane.

The preferred concentration of the fluorescent pigment in the polymer material composition containing the fluorescent pigment is usually and preferably 0.1 to 0.001% by mass although the concentration depends on the type of the polymer material used as a fluorescent pigment or a binder.

Usable as the polymer material containing the fluorescent pigment is polyurethane, polypropylene, polyethylene, polyvinyl chloride, polyamide, polyamide elastomer, or the like proportionally mixed with a curing agent as necessary.

The polymer material contains the fluorescent pigment by, for example, the fluorescent pigment being kneaded into the polymer material by means of a twin-screw kneader. Subsequently, the fluorescent body 3 can be obtained by extrusion or injection molding into a predetermined shape, during which post-processing is performed if necessary. The fluorescent body 3 is fixed to the outer surface of the grip portion 22b in the arm plate portion 22 by means such as adhesion and insert molding.

It should be noted that a contrast agent such as barium sulfate may be added, if necessary, to the polymer material composition containing the fluorescent pigment. As a result, it is also possible to track the fluorescent body 3 in the hollow organ by imaging the fluorescent body 3 with an X-ray even if the indwelling clip 1 comes off the inner wall of the hollow organ after pinching of the inner wall of the hollow organ in the living body or the fluorescent body 3 falls from the clip main body 2.

In addition, the fluorescent body 3 may be a body in which the outer surface of the arm plate portion 22 of the clip main body 2 is coated with a paint containing a fluorescent pigment. In addition, the fluorescent body 3 may be a body in which the outer surface of a plate material formed of a polymer material composition containing a fluorescent pigment is turned into two layers or coated with a transparent material containing no fluorescent pigment. In addition, a fluorescent pigment may be fixed by means of gelatin or the like on the surface of a plate material formed of a material containing no fluorescent pigment. The thickness of the fluorescent body 3 is determined such that sufficient fluorescence characteristics can be obtained. Although not particularly limited, the thickness is preferably 1 to 5,000 μm.

Figure 3A:
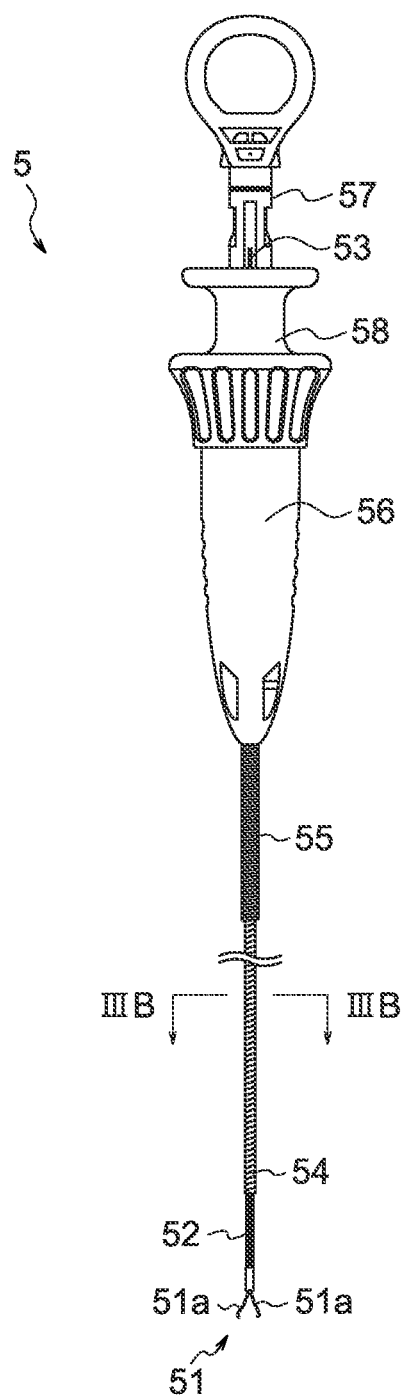
FIG. 3A is a diagram illustrating the appearance of a clip device of the embodiment.
Figure 5:
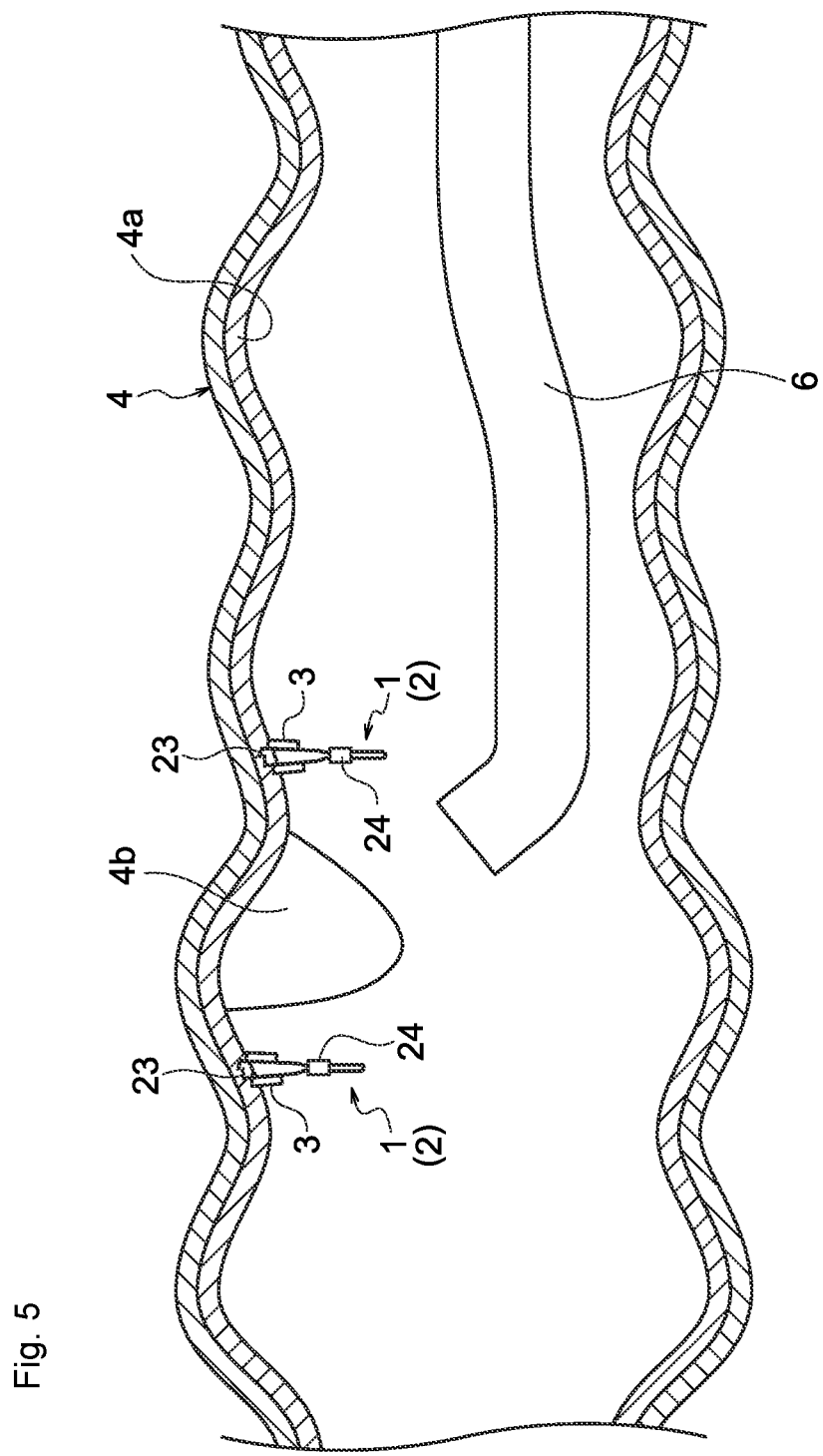
FIG. 5 is a diagram schematically illustrating a state where the clip of FIG. 1 is placed in a hollow organ.

In the present embodiment, the indwelling clip 1 is transported into a hollow organ 4 illustrated in FIG. 5 and the clip 1 is attached to a specific position on the inner wall of the hollow organ 4 by means of, for example, the endoscope that is illustrated in FIG. 5 and the clip device 5 illustrated in FIG. 3A. For example, the clip 1 is attached around a tumor 4b at a part of a mucous membrane (hollow organ inner wall) 4a on the inner wall of the hollow organ 4 so that the tumor is located. It is preferable that a plurality of the clips 1 are attached to the inner wall of the hollow organ 4 although both the single clip 1 and the plurality of clips 1 may be attached to the inner wall of the hollow organ 4.

Here, the clip device 5 illustrated in FIG. 3A will be described. The clip device 5 is to transport the indwelling clip 1 into the body via the treatment instrument guide tube of an endoscope 6 illustrated in FIG. 5 and perform internal tissue gripping and placement (clipping).

The clip device 5 has the connecting hook 51, the inner sheath 52, a drive wire 53, an outer sheath 54, a reinforcing coil 55, a first slider portion 56, a base portion 57, and a second slider portion 58.

Figure 3B:
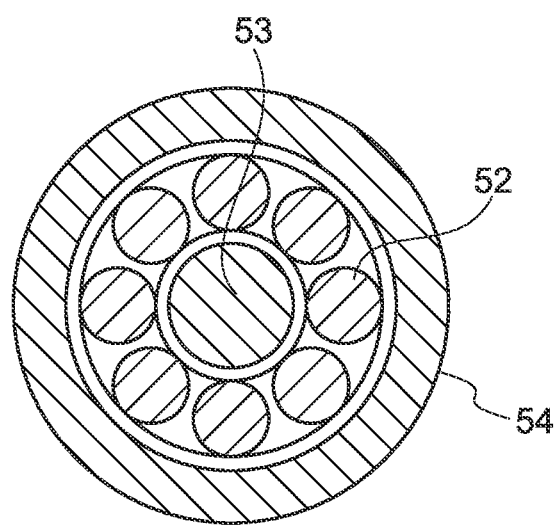
FIG. 3B is a cross-sectional view taken along line IIIB-IIIB in FIG. 3A.

As illustrated in FIG. 3B, the tubular inner sheath 52 is inserted through the tubular outer sheath 54 and the drive wire 53 is inserted through the inner sheath 52. The inner sheath 52 is slidable in the outer sheath 54, and the drive wire 53 is slidable in the inner sheath 52.

The outer sheath 54 is made of a flexible hollow tube, and a coil tube is used in the present embodiment. Usable as the coil tube is a flat wire coil tube obtained by spiral winding of a long flat plate made of metal (stainless steel) or the like. Alternatively, a round wire coil tube or an inner flat coil tube may be used. The inner diameter of the tip portion of the outer sheath 54 is approximately 2 to 3 mm.

The inner sheath 52 is made of a flexible hollow tube, and a wire tube is used in the present embodiment. The wire tube is a tube made of a hollow stranded wire obtained by a plurality of wires (cables) made of metal (stainless steel) or the like being spirally twisted so as to become hollow. It should be noted that the inner sheath 52 may be a sheath in which a wire tube is mainly used and only a part of the tip side thereof is a coil tube. The inner diameter of the tip portion of the inner sheath 52 is approximately 1.5 to 2.5 mm.

The drive wire 53 is made of a flexible wire, and a wire rope is used in the present embodiment. The wire rope is a rope made of a stranded wire obtained by spiral twisting of a plurality of wires (cables) made of metal (stainless steel) or the like. Alternatively, a wire tube similar to the inner sheath 52 may be used as the drive wire 53.

The connecting hook 51 disposed at the distal end of the clip device 5 illustrated in FIG. 3A has a pair of arm portions 51a and 51a made of an elastic body disposed in a substantially V shape toward the tip thereof. By cooperation with the inner sheath 52, the connecting hook 51 is capable of taking two, open and closed, states. Claw portions are formed by folding to the inner side (side of mutual facing) in the tip portions of the arm portions 51a and 51a of the connecting hook 51, and thus the connecting plate portion 21 of the clip main body 2 can be gripped and connected.

The base end portion of the connecting hook 51 is a U-shaped portion that is formed in a substantially U shape and continuous with the base end portions of the pair of arm portions 51a and 51a. The connecting hook 51 can be formed by one slender plate material made of an elastic body being appropriately folded (plastically deformed). Although not particularly limited, the plate material constituting the connecting hook 51 has a plate thickness of approximately 0.20 to 0.24 mm and a width of approximately 0.6 mm. Stainless steel or the like is used as the plate material.

The base end portion of the connecting hook 51 is fixed by laser welding or the like to the tip (distal end) of the drive wire 53 slidably inserted in the inner sheath 52. The connecting hook 51 may be swingable with respect to the drive wire 53 by a substantially annular ring member being fixed by laser welding or the like to the distal end of the drive wire 53 and the U-shaped portion of the connecting hook 51 being passed through the ring member.

The vicinity of the base end (proximal end) side of the outer sheath 54 is inserted in the reinforcing coil 55 and integrally fixed in the reinforcing coil 55. The reinforcing coil 55 is integrally fixed in the first slider portion 56, and the distal end side part of the base portion 57 is inserted and disposed inside the first slider portion 56. The first slider portion 56 is slidable with respect to the base portion 57 such that the first slider portion 56 can be positioned between a position at which the first slider portion 56 has moved to the tip (distal end) side and two positions at which the first slider portion 56 has moved to the base end portion (proximal end) side.

The second slider portion 58 is slidably held by the base portion 57. The inner sheath 52 is fixed to the base portion 57. The proximal end of the drive wire 53 is fixed to the second slider portion 58.

When the second slider portion 58 is slid to the tip side (distal end side) with respect to the base portion 57, the inner sheath 52 is pulled in with respect to the drive wire 53 and the connecting hook 51 at the tip of the drive wire 53 protrudes from the tip of the inner sheath 52 and opens owing to its own elasticity. When the second slider portion 58 is slid to the base end side (proximal end side) with respect to the base portion 57, the drive wire 53 is pulled in with respect to the inner sheath 52 and the connecting hook 51 at the tip of the drive wire 53 gradually closes while moving into the inner sheath 52 and is embedded into the inner sheath 52. As a result, the connecting hook 51 is completely closed.

When the first slider portion 56 is slid to the base end side position with respect to the base portion 57, the inner sheath 52 is capable of protruding from the tip of the outer sheath 54. Conversely, when the first slider portion 56 is slid to the tip side position with respect to the base portion 57, the tip of the inner sheath 52 can be stored (embedded) into the outer sheath 54.

Figure 4A:
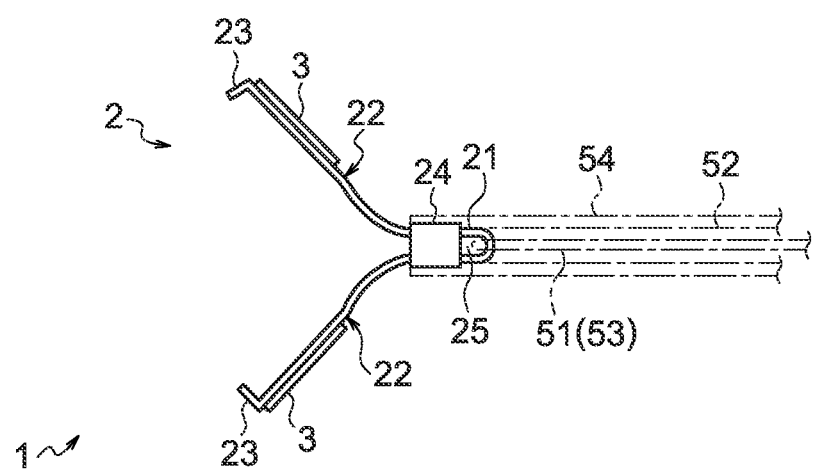
FIG. 4A is a diagram illustrating a state where the clip of FIG. 1 protrudes from the distal end of the clip device of FIG. 3A.
Figure 4B:
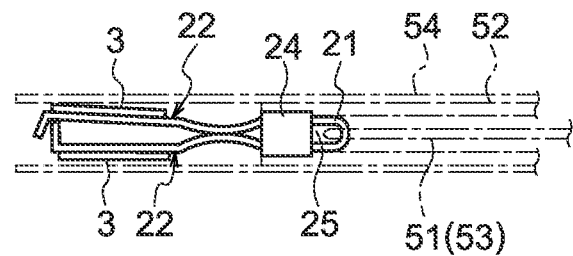
FIG. 4B is a diagram illustrating a state where the clip of FIG. 1 is accommodated in the distal end portion of the clip device of FIG. 3A.

Next, an example of how the indwelling clip 1 is used will be described with reference to FIGS. 4A, 4B, and 5. The connecting hook 51 of the clip device 5 is engaged with a connecting hole 25 formed inside the connecting plate portion 21 of the clip main body 2, and the connecting hook 51 is pulled into the inner sheath 52. As a result, the connecting hook 51 is closed and the clip main body 2 of the indwelling clip 1 is attached to the tip of the inner sheath 52 (see FIG. 4A).

In this state, the distal end portion of the inner sheath 52 to which the indwelling clip 1 (clip main body 2 and fluorescent body 3) is connected is pulled into the outer sheath 54 and the entire indwelling clip 1 is accommodated inside the distal end portion of the outer sheath 54 (see FIG. 4B). In this state, the fastening ring 24 of the clip main body 2 is positioned on the connecting plate portion 21 and the arm plate portion 22 is closed by the action of the inner wall of the outer sheath 54.

The distal end portion of the outer sheath 54 of the clip device 5 where the indwelling clip 1 is mounted is inserted into the hollow organ 4 by means of the endoscope 6 illustrated in FIG. 5. Next, the clip 1 is caused to protrude from the distal end of the outer sheath 54 by the outer sheath 54 illustrated in FIG. 3A being slid to the proximal end side. As a result, the arm plate portion 22 is opened owing to its own elasticity as illustrated in FIG. 4A.

Positioning around a lesion part such as the tumor 4b illustrated in FIG. 5 is performed with the arm plate portion 22 open. Next, the inner sheath 52 illustrated in FIG. 4A is slid to the distal end side with respect to the drive wire 53. Then, the fastening ring 24 slides to the tip side of the arm plate portion 22. As a result, the arm plate portions 22 are gradually closed (approach each other) and a part of the mucous membrane 4a is sandwiched.

The inner sheath 52 is further slid to the distal end side with respect to the drive wire 53, the fastening ring 24 is moved to the tip side of the arm plate portion 22, and the clip main body 2 of the indwelling clip 1 is completely closed. In this state, the inner sheath 52 is slid to the proximal end side with respect to the drive wire 53, the connecting hook 51 is pushed out of the distal end of the inner sheath 52 and opened, and the gripping (engagement) by the connecting hook 51 of the clip main body 2 is released. As a result, the clipping of a part of the mucous membrane 4a by the indwelling clip 1 is completed as illustrated in FIG. 5.

Next, once the clip device 5 is removed from the endoscope, another and separately prepared indwelling clip 1 is mounted onto the distal end portion of the clip device 5 (or a separately prepared clip device similar in configuration to the clip device 5). Next, the distal end portion of the clip device 5 where the separately prepared indwelling clip 1 is mounted is transported to the vicinity of a site positioned on the opposite side across the tumor 4b. Then, the clip 1 is capable of clipping a part of the mucous membrane 4a in a manner similar to what has been described above. In this manner, the plurality of clips 1 are capable of clipping the mucous membrane 4a positioned around the tumor 4b.

As described above, in the present embodiment, the indwelling clip 1 is transported into the hollow organ 4 and the clip 1 is attached to a specific position by means of, for example, the endoscope 6 illustrated in FIG. 5 and the clip device 5 illustrated in FIG. 3A. When the clip 1 is attached, the outer surface of the claw portion 23 of the clip main body 2 bites into and is pressed against the mucous membrane 4a of the inner wall of the hollow organ 4. At the part where the claw portion 23 is pressed, it is possible to eliminate blood from a blood vessel by compressing the underlying vascular network of the mucous membrane 4a. As a result, when irradiation with excitation light is performed inward (toward the mucous membrane side) from the outer side (serosal side) of the hollow organ 4 during thoracotomy, laparotomy, or laparoscopic surgery, the excitation light is unlikely to be absorbed by the hemoglobin contained in the blood of the underlying vascular network of the mucous membrane and the excitation light easily reaches the fluorescent body 3 provided on the outer surface of the arm plate portion 22 near the claw portion 23.

The fluorescent body 3 provided on the arm plate portion 22 contains the fluorescent pigment that emits red or near infrared light as a result of irradiation with excitation light. Accordingly, excitation light emitted from the outside of the hollow organ 4 is hardly absorbed by the hemoglobin and is efficiently absorbed by the fluorescent pigment of the fluorescent body 3. As a result, the fluorescence emitted from the fluorescent pigment of the fluorescent body 3 is also emitted to the outside of the hollow organ 4 while being hardly absorbed by the hemoglobin. Accordingly, the light emission of the fluorescent body 3 attached on the mucous membrane 4a of the hollow organ 4 can be visually and satisfactorily recognized from the outside of the hollow organ 4. In addition, since the fastening ring 24 is metallic, the fastening of the indwelling clip 1 is unlikely to loosen and the attachment stability of the clip 1 is also improved. It should be noted that the visual recognition of the light emission of the fluorescent body 3 from the outside of the hollow organ 4 may be performed by means for facilitating visual fluorescence recognition without being affected by the excitation light being selected in accordance with the wavelengths of the excitation light and the fluorescence. For example, the visual recognition may be performed visually or by image recognition by means of an imaging device such as a medical near infrared camera system and a laparoscope provided with a near infrared camera.

Figure 6:
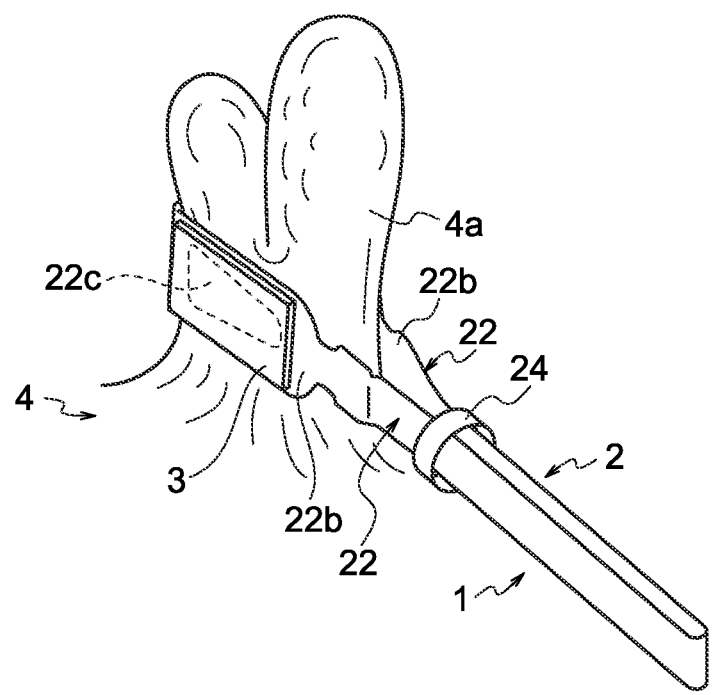
FIG. 6 is a diagram schematically illustrating another example of how the clip of FIG. 1 is stopped.

In addition, although the entire indwelling clip 1 is attached to the mucous membrane 4a substantially perpendicularly to the mucous membrane 4a in the above-described embodiment, the invention is not limited thereto. For example, as illustrated in FIG. 6, at least a part of the clip 1 may be attached to the mucous membrane 4a such that the pair of arm plate portions 22 of the clip 1 sandwich the mucous membrane 4a and a part of the mucous membrane 4a is raised.

Even in a case where the clip 1 is attached to the mucous membrane 4a in this manner, blood can be eliminated from a blood vessel by the underlying vascular network of the mucous membrane 4a being compressed. As a result, when irradiation with excitation light is performed inward (toward the mucous membrane side) from the outer side (serosal side) of the hollow organ 4, the excitation light is not absorbed by the hemoglobin contained in the blood of the underlying vascular network of the mucous membrane and the excitation light easily reaches the fluorescent body 3 provided on the outer surface of the arm plate portion 22.

When the fluorescent body 3 emits light by the excitation light emitted from the outside of the hollow organ 4 during thoracotomy, laparotomy, or laparoscopic surgery, the light emitted by the fluorescent body 3 may be imaged visually, by means of an imaging device, or the like, the fluorescent body 3 can be located from the outside of the hollow organ 4, and the lesion part such as the tumor 4b can be located therefrom. Accordingly, it is possible to excise the hollow organ 4 corresponding to the tumor 4b from the outside by means of an ordinary scalpel, a high-frequency knife, or the like and the excision can be limited to the minimum required site. It should be noted that the clip 1 can be taken out of the body together with the excision of the tumor 4b.

Second Embodiment

Next, a second embodiment of the invention will be described with reference to FIG. 7. It should be noted that the description will focus on changes from the first embodiment described with reference to FIGS. 1 to 6.

Figure 7:
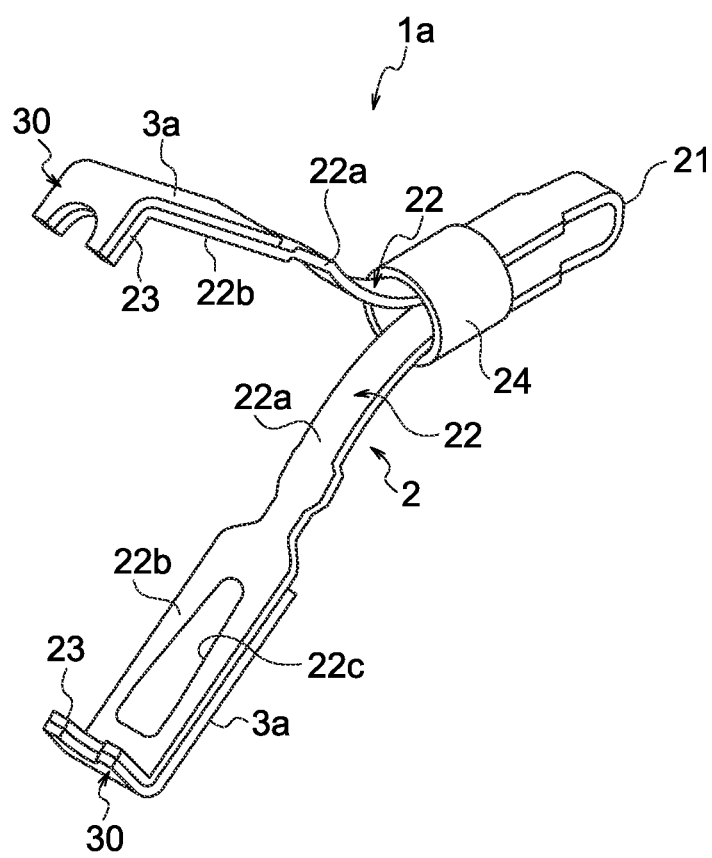
FIG. 7 is a perspective view illustrating an overall configuration of an indwelling clip of another embodiment of the invention in a state where an arm plate portion is open.

As illustrated in FIG. 7, an indwelling clip 1a of the present embodiment is similar to the indwelling clip 1 of the first embodiment except that a fluorescent body 3a is changed in shape and configuration. In other words, in the present embodiment, the clip main body 2 is similar to the clip main body 2 of the first embodiment and only the fluorescent body 3a is different from the fluorescent body 3 of the first embodiment. An extending portion 30 is formed integrally with the fluorescent body 3a, and the extending portion 30 is continuously formed from the outer surface of the grip portion 22b of the arm plate portion 22 to the outer surface of the claw portion 23.

The extending portion 30 is formed on each fluorescent body 3a and is continuously formed from the grip portion 22b of the arm plate portion 22 to the outer surface of the claw portion 23. The extending portion 30 is formed integrally with the fluorescent body 3a. A polymer material composition containing a fluorescent pigment or the like constitutes the extending portion 30.

Also in the present embodiment, the indwelling clip 1a is transported into the hollow organ 4 and the clip 1a is attached to a specific position by means of, for example, the endoscope 6 illustrated in FIG. 5 and the clip device 5 illustrated in FIG. 3A. When the clip 1a is attached, the tip portion of the claw portion 23 of the clip main body 2 bites into the mucous membrane 4a of the inner wall of the hollow organ 4 together with the extending portion 30 and the extending portion 30 on the outer surface of the claw portion 23 is pressed against the mucous membrane 4a. At the part where the extending portion 30 is pressed, it is possible to eliminate blood from a blood vessel by compressing the underlying vascular network of the mucous membrane 4a. As a result, when irradiation with excitation light is performed inward (toward the mucous membrane side) from the outer side (serosal side) of the hollow organ 4 during thoracotomy, laparotomy, or laparoscopic surgery, the excitation light is unlikely to be absorbed by the hemoglobin contained in the blood of the underlying vascular network of the mucous membrane and the excitation light easily reaches the extending portion 30 of the fluorescent body 3a provided on the outer surface of the claw portion 23 and the fluorescent body 3a provided on the outer surface of the arm plate portion 22. In the present embodiment in particular, the area of the fluorescent body 3a is large and the fluorescent area is large owing to the presence of the extending portion 30, and thus it is particularly easy to visually recognize the fluorescent light. Others are similar to those of the first embodiment described above.

Third Embodiment

Next, a third embodiment of the invention will be described with reference to FIGS. 8 to 10. It should be noted that the description will focus on changes from the first embodiment described with reference to FIGS. 1 to 6.

Figure 8:
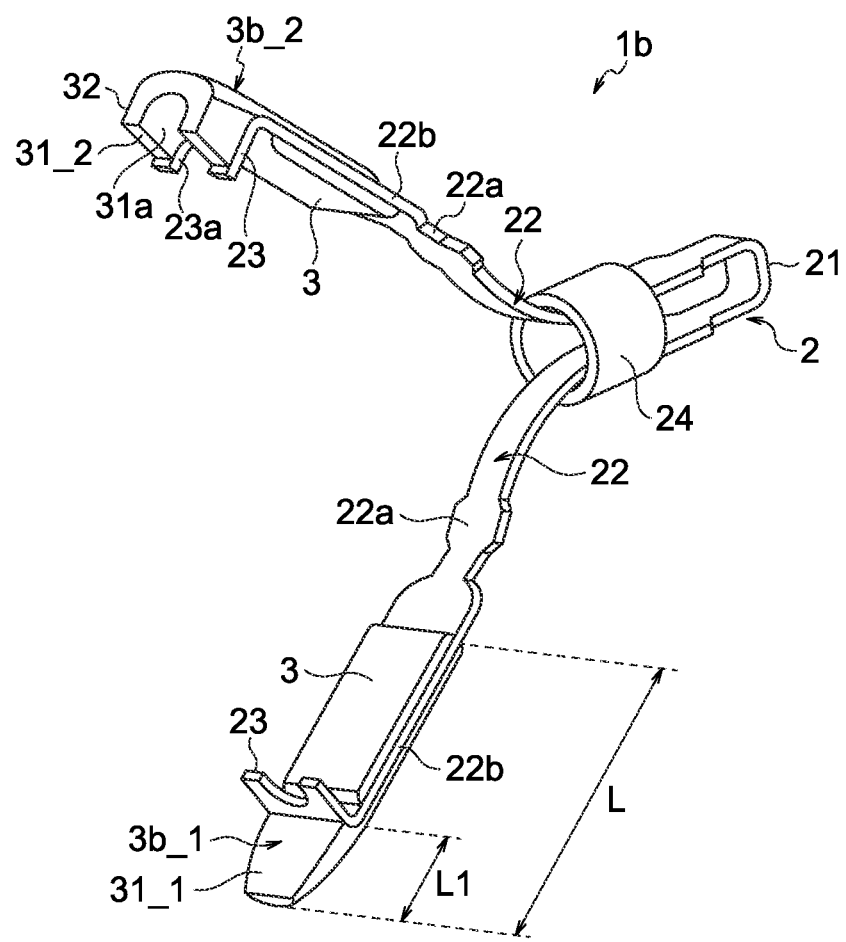
FIG. 8 is a perspective view illustrating an overall configuration of an indwelling clip of yet another embodiment of the invention in a state where an arm plate portion is open.

As illustrated in FIG. 8, an indwelling clip 1b of the present embodiment has fluorescent bodies 3b_1 and 3b_2 in addition to the fluorescent body 3. In the present embodiment, the fluorescent body 3 is attached on the inner surface of each of the pair of arm plate portions 22 (grip portions 22b) and the grip portion 22b is sandwiched between the fluorescent body 3 and the fluorescent body 3b_1 (3b_2).

The outer surfaces of the fluorescent bodies 3b_1 and 3b_2 are curved along the width direction of the fluorescent bodies 3b_1 and 3b_2 (similar to the width direction of the arm plate portion 22) from the viewpoint of easily accommodating the entire clip 1b inside the distal end portion of the outer sheath 54 of the clip device 5 (see FIG. 4B).

The fluorescent body 3b_1 is provided on one arm plate portion 22 of the pair of arm plate portions 22 and 22. The fluorescent body 3b_2 is provided on the other arm plate portion 22 of the pair of arm plate portions 22 and 22. More specifically, as illustrated in FIG. 9, the fluorescent body 3b_2 is provided on the arm plate portion 22 where the claw portion 23 is disposed outside when the pair of arm plate portions 22 and 22 are closed.

As illustrated in FIG. 8, a tip protruding portion 31_1 is formed integrally with the fluorescent body 3b_1 provided on the one arm plate portion 22. A tip protruding portion 31_2 is formed integrally with the fluorescent body 3b_2 provided on the other arm plate portion 22. The tip protruding portions 31_1 and 31_2 have a protrusion shape and protrude from the tip portion of the arm plate portion 22 (grip portion 22b) to the outside of the tip of the arm plate portion 22.

The tip protruding portion 31_1 is made of a flat plate-shaped fluorescent body and is tapered in the width direction and the thickness direction toward the tip thereof. Accordingly, the tip protruding portion 31_1 has excellent piercing properties and the tip protruding portion 31_1 is capable of easily biting into the mucous membrane 4a of the inner wall of the hollow organ 4 with the clip 1b attached on the inner wall of the hollow organ 4.

The wall thickness of the tip protruding portion 31_1 is approximately equal to or larger than the wall thickness of the fluorescent body 3 illustrated in the first embodiment. Accordingly, the tip protruding portion 31_1 is given sufficient strength and the tip protruding portion 31_1 is capable of biting into the mucous membrane 4a of the inner wall of the hollow organ 4 without bending with the clip 1b attached on the inner wall of the hollow organ 4.

The tip protruding portion 31_1 protrudes along the longitudinal direction of the arm plate portion 22. The ratio L1/L of a protrusion length L1 from the tip portion of the arm plate portion 22 to a total length L of the fluorescent body 3b_1 is preferably 0.15 to 0.50. The same applies to the tip protruding portion 31_2 and the respective protrusion lengths of the tip protruding portion 31_1 and the tip protruding portion 31_2 are substantially equal to each other.

The tip protruding portion 31_2 is curved (bent) along the width direction such that the shape (cross-sectional shape) of the tip protruding portion 31_2 is a substantially C shaped. In addition, a fluorescent body larger in volume (or area) than the tip protruding portion 31_1 constitutes the tip protruding portion 31_2. Accordingly, the fluorescence intensity of the tip protruding portion 31_2 exceeds the fluorescence intensity of the tip protruding portion 31_1.

The shape of the tip protruding portion 31_2 corresponds to the shape of the outer surface of the claw portion 23, and a part (side portion 32) of the tip protruding portion 31_2 protrudes in the extension direction of the claw portion 23. Accordingly, most of the claw portion 23 is covered with one end of the side portion 32 of the tip protruding portion 31_2. The side portion 32 protrudes from the outer surface of the claw portion 23 to the outside of the tip of the arm plate portion 22.

Figure 9:
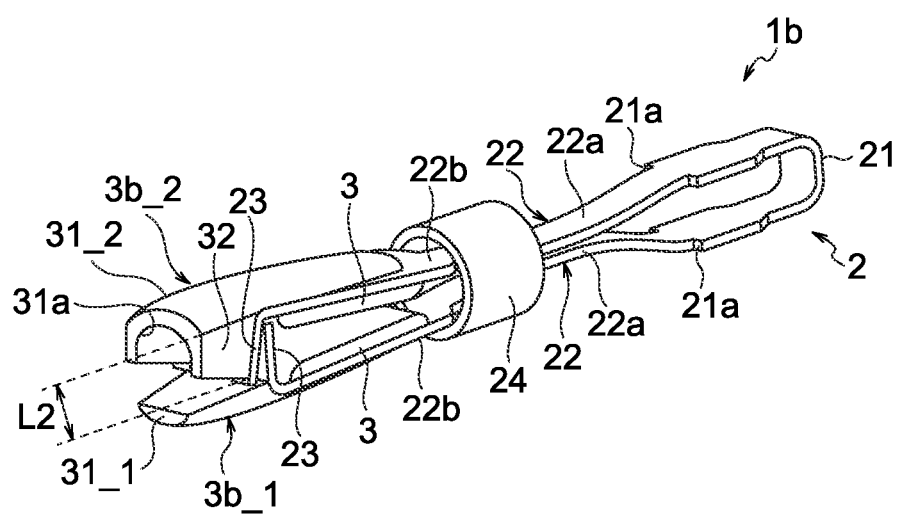
FIG. 9 is a perspective view illustrating a state where the arm plate portion of the clip of FIG. 8 is closed.
Figure 10:
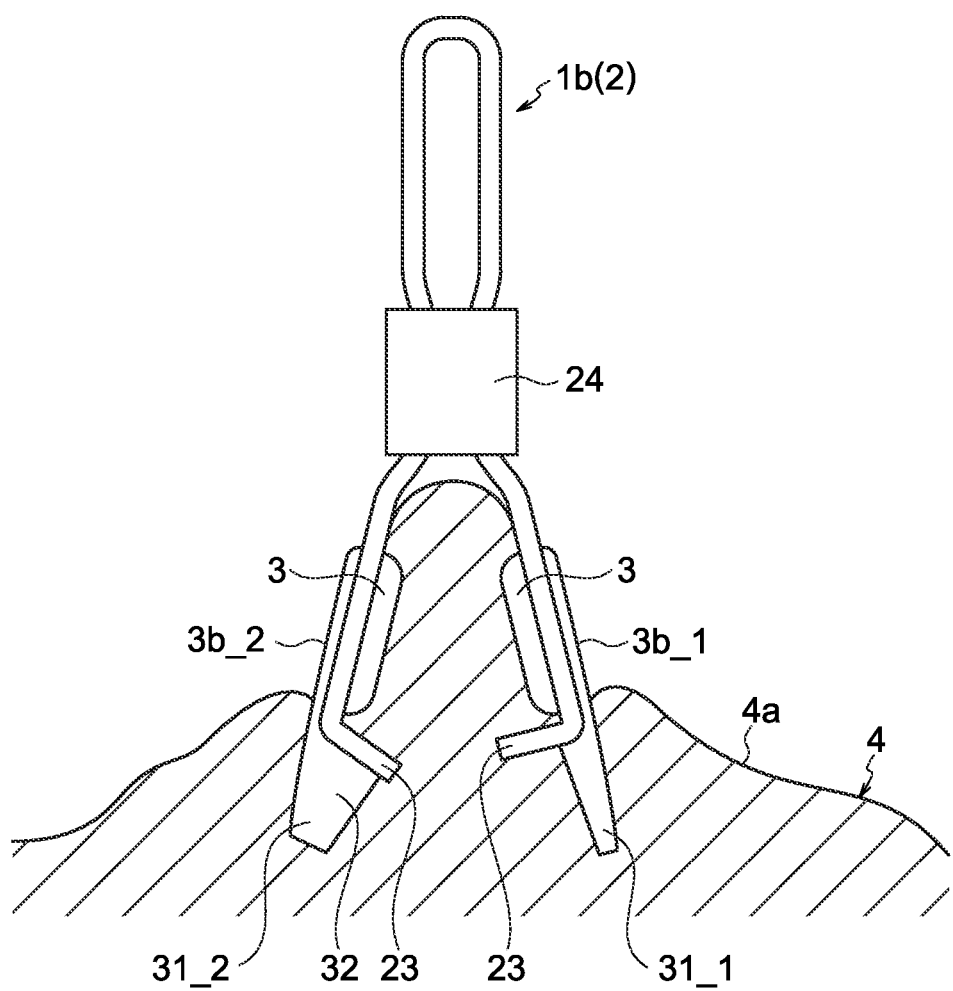
FIG. 10 is a diagram schematically illustrating a state where the clip of FIG. 8 is placed in a hollow organ.

As illustrated in FIG. 9, a length L2 of the side portion 32 along the extension direction of the claw portion 23 is approximately equal to or shorter than the length of the claw portion 23 in the extension direction. Accordingly, the tip protruding portion 31_2 does not come into contact with the tip protruding portion 31_1 and the tip protruding portions 31_1 and 31_2 do not hinder the clipping by the clip 1b when the pair of arm plate portions 22 and 22 are closed.

In addition, the length L2 decreases toward the tip of the fluorescent body 3b_2 and the tip protruding portion 31_2 is tapered as a whole toward the tip thereof. Accordingly, the tip protruding portion 31_2 has excellent piercing properties and the tip protruding portion 31_2 is capable of easily biting into the mucous membrane 4a of the inner wall of the hollow organ 4 with the clip 1b attached on the inner wall of the hollow organ 4.

A recessed notch portion 31a is formed at the intermediate part of the tip of the tip protruding portion 31_2. Alternatively, the notch portion 31a may be omitted in a case where the notch portion 23a (see FIG. 8) is not formed in the claw portion 23.

Also in the present embodiment, the indwelling clip 1b is transported into the hollow organ 4 and the clip 1b is attached to a specific position by means of, for example, the endoscope 6 illustrated in FIG. 5 and the clip device 5 illustrated in FIG. 3A. When the clip 1b is attached, the tip protruding portions 31_1 and 31_2 bite into the mucous membrane 4a of the inner wall of the hollow organ 4 together with the tip portion of the claw portion 23 of the clip main body 2 and the tip protruding portions 31_1 and 31_2 (tip-most portions of the tip protruding portions 31_1 and 31_2 in particular) are pressed against the mucous membrane 4a. At the parts where the tip protruding portions 31_1 and 31_2 are pressed, it is possible to eliminate blood from a blood vessel by compressing the underlying vascular network of the mucous membrane 4a. As a result, when irradiation with excitation light is performed inward (toward the mucous membrane side) from the outer side (serosal side) of the hollow organ 4 during thoracotomy, laparotomy, or laparoscopic surgery, the excitation light is unlikely to be absorbed by the hemoglobin contained in the blood of the underlying vascular network of the mucous membrane and the excitation light easily reaches the tip protruding portions 31_1 and 31_2 of the fluorescent bodies 3b_1 and 3b_2 and the fluorescent bodies 3b_1 and 3b_2 provided on the outer surface of the arm plate portions 22. In the present embodiment in particular, the area of the fluorescent body 3b_2 is large and the fluorescent area is large owing to the presence of the tip protruding portion 31_2, and thus it is particularly easy to visually recognize the fluorescent light. Others are similar to those of the first embodiment described above.

In addition, in the present embodiment, the pair of arm plate portions 22 and 22 are provided with the fluorescent bodies 3b_1 and 3b_2, respectively. Accordingly, when the mucous membrane 4a of the inner wall of the hollow organ 4 is bitten by the fluorescent body 3b_1 and the fluorescent body 3b_2 as illustrated in FIG. 10, it is possible to prevent the clip 1b from falling to one side of the pair of arm plate portions 22 and 22 and maintain a state where the clip 1b is erect substantially perpendicularly to the mucous membrane 4a.

Fourth Embodiment

Next, a fourth embodiment of the invention will be described with reference to FIGS. 11 to 13. It should be noted that the description will focus on changes from the first embodiment described with reference to FIGS. 1 to 6.

Figure 11:
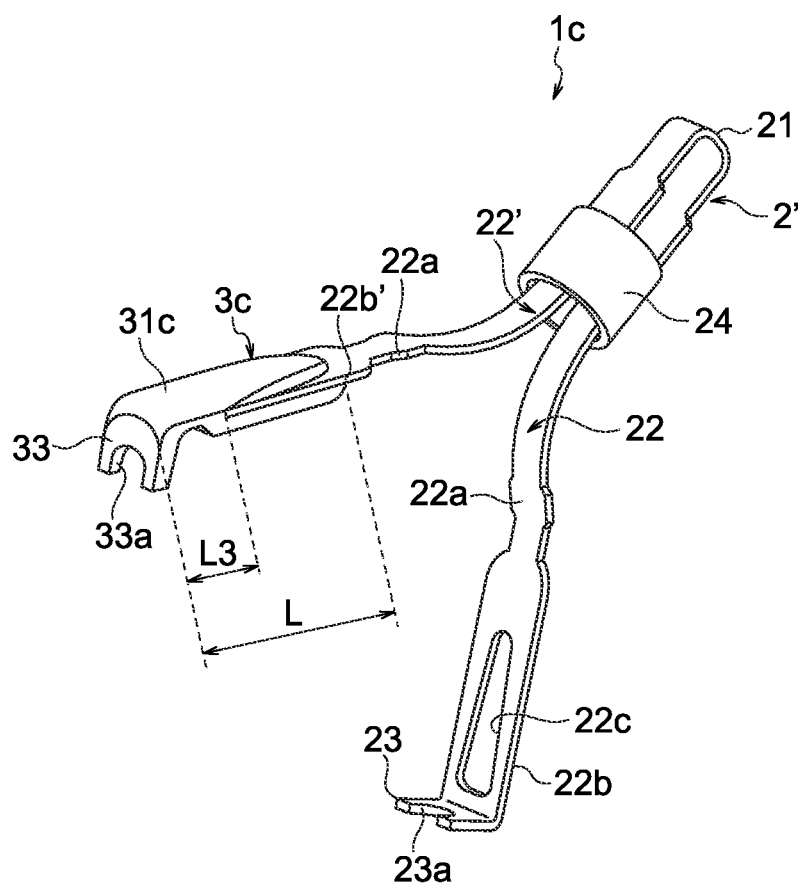
FIG. 11 is a perspective view illustrating an overall configuration of an indwelling clip of yet another embodiment of the invention in a state where an arm plate portion is open.
Figure 12:
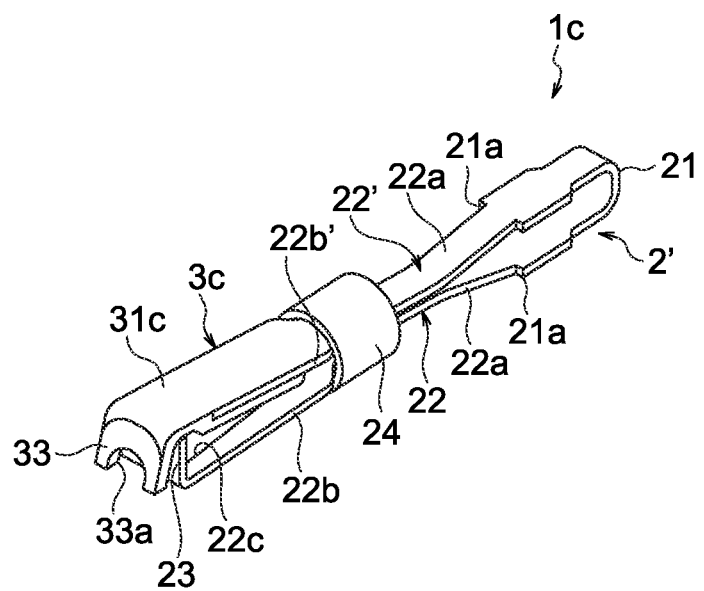
FIG. 12 is a perspective view illustrating a state where the arm plate portion of the clip of FIG. 11 is closed.

As illustrated in FIG. 11, an indwelling clip 1c of the present embodiment has a clip main body 2' and a fluorescent body 3c. As illustrated in FIG. 13, the clip main body 2' has an arm plate portion 22' in addition to the arm plate portion 22.

The arm plate portion 22' differs from the arm plate portion 22b in that the arm plate portion 22' has a grip portion 22b'. A recessed notch portion 25 is formed at the intermediate part of the tip of the grip portion 22b', and the tip portion of the grip portion 22b' is not provided with the claw portion 23.

When the fluorescent body 3c is formed by injection molding or the like in the present embodiment, the grip portion 22b' of the arm plate portion 22' is integrated with the fluorescent body 3c by insert molding or the like. As illustrated in FIG. 11, the fluorescent body 3c has a tip protruding portion 31c. The tip protruding portion 31c differs from the tip protruding portion 31_1 illustrated in FIG. 8 in that the tip protruding portion 31c has a claw-shaped portion 33.

The tip protruding portion 31c protrudes from the tip portion of the arm plate portion 22' along the longitudinal direction of the arm plate portion 22'. The ratio L3/L of a protrusion length L3 of the tip protruding portion 31c to the total length L of the fluorescent body 3c is preferably 0.15 to 0.50.

The claw-shaped portion 33 is configured as a part of the tip protruding portion 31c and is formed integrally with the tip portion of the tip protruding portion 31c. As illustrated in FIG. 12, the claw-shaped portion 33 is disposed outside the claw portion 23 formed on one arm plate portion 22 when the pair of arm plate portions 22 and 22' are closed. It should be noted that the claw-shaped portion 33 may be configured as the entire tip protruding portion 31c.

The claw-shaped portion 33 is bent at a predetermined angle with respect to the extension direction of the tip protruding portion 31c and extends toward the inner side (that is, in the closing direction of the pair of arm plate portions 22 and 22'). The wall thickness of the claw-shaped portion 33 is approximately equal to or larger than the wall thickness of the fluorescent body 3 illustrated in the first embodiment. The claw-shaped portion 33 has a recessed notch portion 33a at the intermediate part of the tip thereof.

The claw-shaped portion 33 has a shape corresponding to the claw portion 23 formed in the tip portion of the arm plate portion 22 and is similar in role to the claw portion 23. In other words, in the present embodiment, the claw-shaped portion 33 replaces the claw portion 23 in one arm plate portion 22'. Accordingly, when the pair of arm plate portions 22 and 22' are closed, the claw portion 23 formed in the tip portion of the arm plate portion 22 and the claw-shaped portion 33 of the fluorescent body 3c provided on the arm plate portion 22' engage with each other and the mucous membrane 4a of the inner wall of the hollow organ 4 can be grabbed by means of the claw portion 23 and the claw-shaped portion 33.

In the present embodiment, a part of the fluorescent body 3c is also provided on the inner surface of the arm plate portion 22' (grip portion 22b') and the outer surface and the inner surface of the grip portion 22b' are covered with the fluorescent body 3c. The part of the fluorescent body 3c that is formed on the inner surface of the grip portion 22b' is connected to the lower surface of the tip protruding portion 31c.

Figure 13:
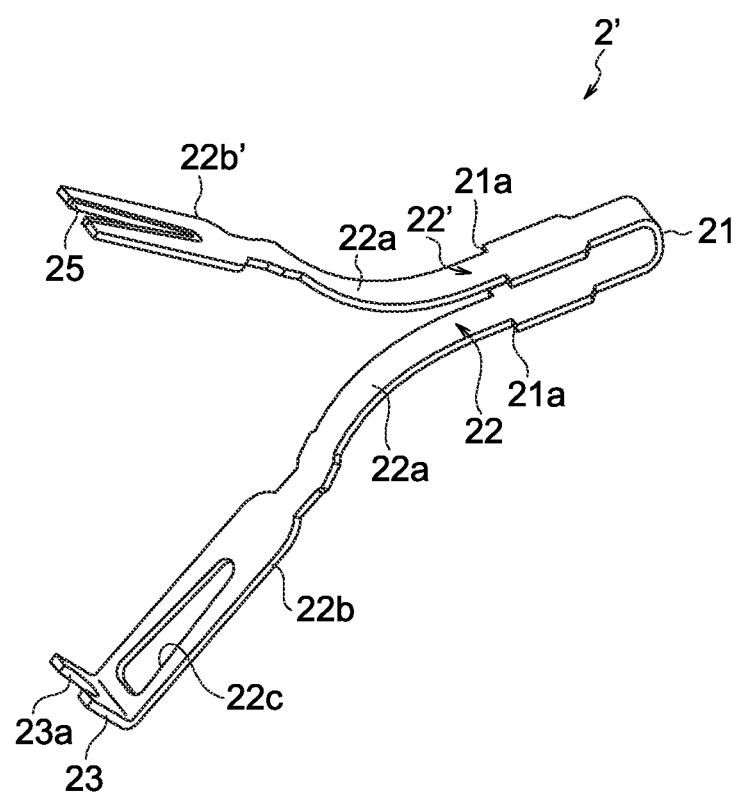
FIG. 13 is a perspective view illustrating an overall configuration of the clip main body that is illustrated in FIG. 11.

The fluorescent body 3c illustrated in FIG. 11 enters the notch portion 25 of the grip portion 22b' illustrated in FIG. 13. Accordingly, the fluorescent body 3c is firmly fixed to the grip portion 22b' and it is possible to prevent the fluorescent body 3c from falling (slipping) from the grip portion 22b'.

Also in the present embodiment, the indwelling clip 1c is transported into the hollow organ 4 and the clip 1c is attached to a specific position by means of, for example, the endoscope 6 illustrated in FIG. 5 and the clip device 5 illustrated in FIG. 3A. When the clip 1c is attached, the tip portion of the claw portion 23 of the clip main body 2' and the claw-shaped portion 33 of the fluorescent body 3c bite into the mucous membrane 4a of the inner wall of the hollow organ 4 and the tip protruding portion 31c (claw-shaped portion 33 of the tip protruding portion 31c in particular) is pressed against the mucous membrane 4a. At the part where the tip protruding portion 31c is pressed, it is possible to eliminate blood from a blood vessel by compressing the underlying vascular network of the mucous membrane 4a. As a result, when irradiation with excitation light is performed inward (toward the mucous membrane side) from the outer side (serosal side) of the hollow organ 4 during thoracotomy, laparotomy, or laparoscopic surgery, the excitation light is unlikely to be absorbed by the hemoglobin contained in the blood of the underlying vascular network of the mucous membrane and the excitation light easily reaches the tip protruding portion 31c of the fluorescent body 3c. In the present embodiment in particular, the area of the fluorescent body 3c is large and the fluorescent area is large owing to the presence of the claw-shaped portion 33, and thus it is particularly easy to visually recognize the fluorescent light. Others are similar to those of the first embodiment described above.

In addition, in the present embodiment, it is possible to increase the degree of freedom in designing the fluorescent body 3c and the clip main body 2' (grip portion 22b' in particular) by forming the fluorescent body 3c by injection molding or the like, examples of which include a part of the tip protruding portion 31c constituting the claw-shaped portion 33 and introducing a shape (notch portion 25) that has an anti-slip effect into the grip portion 22b'.

It should be noted that the invention is not limited to the above-described embodiments and the invention can be modified in various ways. For example, each element disclosed in the above-described embodiments can be modified in various ways and combined.

For example, a part of the inner surface of the fluorescent body 3 (surface on the side that is opposite to the outer surface and the side where the arm plate portions 22 and 22 face each other) may enter the through hole 22c formed in the grip portion 22b and engage with the through hole 22c. In that case, the fluorescent body 3 is more firmly fixed to the arm plate portion 22 and is unlikely to fall. In addition, the fluorescent body 3 may be formed so as to be continuous up to the inner surface of the grip portion 22b of the arm plate portion 22. In that case, the fluorescent body 3 is even more firmly fixed to the arm plate portion 22. In addition, the thickness of the fluorescent body 3 provided on the outer surface of the arm plate portion 22 and the thickness of the fluorescent body 3 provided on the inner surface of the arm plate portion 22 may be changed.

For example, the thickness of the fluorescent body 3 provided on the outer surface of the arm plate portion 22 may be smaller than the thickness of the fluorescent body 3 provided on the inner surface of the arm plate portion 22. Alternatively, the fluorescent body 3 may be mounted only on the inner surface of the arm plate portion 22. In that case, a part of the fluorescent body 3 may enter the through hole 22c and be engaged with the through hole 22c. It should be noted that the pair of arm plate portions 22 and 22 are easily pulled into the outer sheath 54 illustrated in FIG. 4B by the fluorescent body 3 being provided on the inner surface of the arm plate portion 22. In addition, by the fluorescent body 3 being provided on the inner surface of the arm plate portion 22, the fluorescent body 3 is easily and reliably pressed against the mucous membrane 4a in a case where clipping as illustrated in FIG. 6 is performed by means of the indwelling clip 1. Preferably, the fluorescent body 3 is provided on the inner surfaces of the pair of arm plate portions 22 when clipping as illustrated in FIG. 6 is performed. In this case, the mucous membrane 4a can be sandwiched between the fluorescent bodies 3 and 3 on both sides.

In addition, the biological tissue in which the indwelling clips of the above-described embodiments are used is not particularly limited. Examples of the biological tissue include hollow organs such as the digestive tract, trachea, bladder, bile duct, pancreatic duct, ureter, renal tract, liver, kidney, and lung. In addition, the indwelling clip of the invention can also be used for applications other than partial body lumen excision.

In the fourth embodiment, the fluorescent body 3c is integrated with the grip portion 22b' of the arm plate portion 22' by insert molding. Alternatively, the fluorescent body 3c may be fixed to the grip portion 22b' by means such as adhesion.

In the fourth embodiment, the fluorescent body 3 may be engaged with the through hole 22c formed in the arm plate portion 22 in a manner as illustrated in FIG. 1. In this case, the through hole 22c may be partially covered with the fluorescent body 3. For example, only the vicinity of the peripheral edge of the through hole 22c may be covered with the fluorescent body 3.

In the fourth embodiment, the shape of the grip portion 22b' of the arm plate portion 22' is not particularly limited and may be appropriately changed. For example, the notch portion 25 may be formed in the grip portion 22b' such that the width thereof decreases toward the tip side of the grip portion 22b'.

EXPLANATIONS OF LETTERS OR NUMERALS 1, 1a, 1b, 1c INDWELLING CLIP
2, 2' CLIP MAIN BODY
21 CONNECTING PLATE PORTION
21a STOPPER PROTRUSION
22, 22' ARM PLATE PORTION
22a BASE END PORTION
22b, 22b' GRIP PORTION
22c THROUGH HOLE
23 CLAW PORTION
23a NOTCH PORTION
24 FASTENING RING
25 NOTCH PORTION
3, 3a, 3b_1, 3b_2, 3c FLUORESCENT BODY
30 EXTENDING PORTION
31_1, 31_2, 31c TIP PROTRUDING PORTION
31a NOTCH PORTION
32 SIDE PORTION
33 CLAW-SHAPED PORTION
33a NOTCH PORTION
4 HOLLOW ORGAN
4a MUCOUS MEMBRANE
4b TUMOR
5 CLIP DEVICE
51 CONNECTING HOOK
51a ARM PORTION
52 INNER SHEATH
53 DRIVE WIRE
54 OUTER SHEATH
55 REINFORCING COIL
56 FIRST SLIDER PORTION
57 BASE PORTION
58 SECOND SLIDER PORTION
6 ENDOSCOPE

What is claimed is:

1. An indwelling clip comprising:
a pair of arm plate portions configured to be opened in a substantially V shape with an elastic force;
claw portions formed on respective tip portions of the arm plate portions; and
a fastening ring attached to the arm plate portions so as to be movable along a longitudinal direction of the pair of arm plate portions and be able to close the pair of arm plate portions by moving in a direction toward the claw portions,
wherein at least one of the arm plate portions is provided with a fluorescent body containing a fluorescent pigment emitting red or near infrared light by being irradiated with excitation light,
wherein the fluorescent body comprises:
a first end directly coupled to a corresponding one of the arm plate portions,
a second free end opposing the first end and not directly coupled to the corresponding arm plate portion, and
an intermediate point disposed between the first end and the second free end, the intermediate point directly contacting and overlapping the tip portion of the corresponding plate portion,
wherein the fluorescent body comprises a tip protruding portion extending distally beyond a corresponding one of the claw portions to the second free end of the fluorescent body, wherein the ratio L1/L of a protrusion length L1 from the tip portion of the corresponding arm plate portion to a total length L of the fluorescent body is 0.15 or more,
wherein the distance between the first end and the second free end defines the total length L of the fluorescent body, wherein the distance between the intermediate point and the second free end of the fluorescent body defines protrusion length L1, and
wherein the corresponding claw portion extends in an angle from the tip portion of the corresponding arm plate portion that overlaps the intermediate point of the fluorescent body.

2. The indwelling clip according to claim 1, wherein the fluorescent body is provided on an outer surface or an inner surface of the arm plate portions.

3. The indwelling clip according to claim 1, wherein the fluorescent body is engaged with a through hole formed on the arm plate portions.

4. The indwelling clip according to claim 1, wherein the fastening ring is made of metal.

5. The indwelling clip according to claim 1, wherein the tip protruding portion comprises tip protruding portions provided on each of the pair of arm plate portions.

6. The indwelling clip according to claim 5, wherein a first selected one of the tip protruding portions has a claw shape.

7. The indwelling clip according to claim 6, wherein a second selected one of the tip protruding portions extends linearly and distally beyond the corresponding claw portion.

8. The indwelling clip according to claim 6, wherein the first selected one of the tip protruding portions comprises a recessed notch portion.

9. The indwelling clip according to claim 1, wherein the ratio L1/L is 0.15 to 0.50.

10. The indwelling clip according to claim 1, wherein the protrusion length L1 is greater than the thickness of the respective arm plate portion.

* * * * *